United States Patent [19]

May

[11] 4,296,641
[45] Oct. 27, 1981

[54] RACK AND PINION GEAR BEARING SUPPORT

[75] Inventor: James I. May, Royal Oak, Mich.

[73] Assignee: Ford Motor Company, Dearborn, Mich.

[21] Appl. No.: 135,601

[22] Filed: Mar. 31, 1980

[51] Int. Cl.³ .............................................. F16H 1/04
[52] U.S. Cl. ........................................ 74/422; 74/498; 308/3 R; 308/21
[58] Field of Search ........................ 74/422, 410, 498; 308/3 R, 21

[56] References Cited

U.S. PATENT DOCUMENTS

| Re. 28,740 | 3/1976 | Bishop | 74/422 |
| 2,973,658 | 3/1961 | Bishop | 74/498 X |
| 3,064,491 | 11/1962 | Bishop | 74/498 X |
| 3,267,763 | 8/1966 | Merritt | 74/498 X |
| 3,623,379 | 11/1971 | Bradshaw et al. | 74/498 |
| 3,820,415 | 6/1974 | Cass | 74/498 |
| 4,224,833 | 9/1980 | Jablonsky | 74/422 |

Primary Examiner—C. J. Husar
Assistant Examiner—Conrad Berman
Attorney, Agent, or Firm—Frank G. McKenzie; Donald J. Harrington

[57] ABSTRACT

A rack and pinion gear set wherein a driving pinion having spur gear or helical gear teeth rotates to produce axial displacement of the rack member has a saddle bearing located above the pinion for supporting the rack shaft. The saddle bearing furnishes support surfaces, which engage complementary support surfaces on the rack shaft. The surfaces have a center of curvature located at approximately the center of the contact area on the face of the pinion teeth. A second embodiment has a cradle bearing for supporting the rack shaft on planar surfaces and has, at its outer periphery, a cylindrical surface which is held by a saddle bearing. The center of curvature of the cylindrical surface is likewise located approximately at the mean contact surface on the pinion teeth faces.

5 Claims, 4 Drawing Figures

RACK AND PINION GEAR BEARING SUPPORT

BACKGROUND OF THE INVENTION

1. Field of the Invention

This invention is an improvement for rack and pinion gear sets wherein the rack shaft is supported by a bearing that allows axial displacement and some rocking motion. More particularly, the invention pertains to the nature of the surface supporting the rack shaft and the position of its center with respect to the locus of the resultant forces applied by the pinion to the teeth of the rack shaft.

2. Description of the Prior Art

In conventional rack and pinion steering gear systems, both ends of the rack shaft extend outwardly from a steering gear housing and are connected to tie rods that transmit steering forces to the wheels of the vehicle. The ends of the rack shaft and tie rods are subject to road loading which applies severe impact and vibratory loads to the steering system. In order to avoid premature failure, the bending strength of the shaft must be sufficient to sustain the dynamic loading.

It is conventional practice, to cut the teeth of the rack shaft only to a shallow depth of the cross section of the shaft in order that the residual portion of the cross section will have sufficient strength to withstand the dynamic load environment in which the steering system must operate. Although this technique produces satisfactory results regarding the bending strength of the shaft, it has been recognized that the loads applied to the rack shaft by the pinion operate to produce an undesirable rotation of the rack shaft about its central longitudinal axis. This phenomenon is the result of the rack teeth being cut to a shallow depth which necessarily locates the resultant of the applied forces at a position substantially eccentric of the axis of the shaft. The loads have a tangential component about the axis which tends to rotate the shaft and cause the teeth of the rack to rotate, at one extremity of the tooth length, into closer meshing engagement with the pinion. The teeth at the opposite extremity of the tooth length, rotate out of meshing engagement with the pinion. As a result, greater contact force develops at the end where engagement is increased and lesser contact results at the opposite end of the tooth. Due to the nonuniform distribution of the loads across the tooth length, the bending stress in the tooth is substantially greater at the root of the tooth adjacent the increased contact loading zone. Of course, at the opposite end of the tooth, the average bending stresses at the root are less than if the contact load were uniformly distributed along the tooth length. It has been calculated that the increase in bending stress at the most highly loaded extremity of the tooth exceeds the average bending stress of the tooth by approximately 20% as compared with the bending stresses that would result if the load were uniformly distributed.

One approach taken in the prior art to reduce rotation of the shaft and to more uniformly distribute the contact loads between the pinion and the rack has been to cut the teeth deeply into the rack cross-section so that the resultant of the forces applied by the pinion aligns with the axis of the shaft. When this is done, rotation of the shaft is theoretically avoided and the contact forces and associated stresses are more uniformly distributed. However, the cross-section of the rack shaft that must transmit the bending forces is substantially reduced by this machining technique and the ability of the shaft to withstand bending loads in the dynamic environment is substantially reduced.

SUMMARY OF THE INVENTION

My invention provides improvements in rack and pinion gear systems wherein the teeth of the rack are cut to a shallow depth thereby maintaining the requisite beam bending strength of the shaft but avoiding the tendency for the rack shaft to rotate. However, the teeth of the rack can be formed to any depth which will satisfy the strength requirements of the beam.

According to my invention, the rack shaft is formed with at least two convex surfaces positioned equidistant from a plane that contains the rack shaft. These surfaces, which may be cylindrical, have a common center of curvature and are preferably located at the bearing support provided for the shaft by the steering system housing. A saddle bearing having complementary concave surfaces mating with the support surfaces is formed in or attached to the housing. The center of curvature of the convex cylindrical bearing surfaces of the shaft and the concave cylindrical bearing surfaces of the saddle bearing are coincident with the center of the contact area of the rack and tooth profile when the contact area is projected onto a radius of a rack shaft drawn through the center of the rack tooth. In this way, the bearing forces supporting the rack shaft are aligned with and directed opposite to the contact forces applied to the rack by the pinion. The undesired rotation of the rack shaft is thereby eliminated.

The cylindrical shape of the mating surfaces of the saddle bearing and the shaft allows the shaft to rotate about the center of curvature enough to produce line-to-line contact between the pinion and the rack teeth. Some minor rack rotation is permitted to occur on the bearing surface in order to produce the desirable line-to-line contact, which results in a uniformly distributed load across the tooth face. However, rotation of the rack shaft resulting from unbalanced tangentially directed forces acting on the rack tooth face tending to rotate the rack about its polar axis is eliminated.

A second embodiment of my invention furnishes one continuous part-cylindrical bearing surface between the saddle bearing and an intermediate member having a center of curvature coincident with the center of the contact area of the rack tooth profile as previously described. In this case, the intermediate member bears on two planar surfaces formed on the rack shaft on opposite sides of and symmetrically disposed about a plane of symmetry that includes the axis of the rack shaft. The cylindrical bearing surface permits the minor amounts of rack rotation that work to bring about the desired line-to-line contact between the pinion and rack teeth, but eliminates the unbalanced forces that would produce the greater amounts of rack rotation and the unbalanced distribution of contact force across the tooth face. Actually, any contact surface can be provided between the rack shaft and the support bearing provided it allows self-alignment of the rack and the pinion by rocking about the center of the forces applied to the rack teeth by the pinion.

DESCRIPTION OF THE PREFERRED EMBODIMENTS

Figure 1:
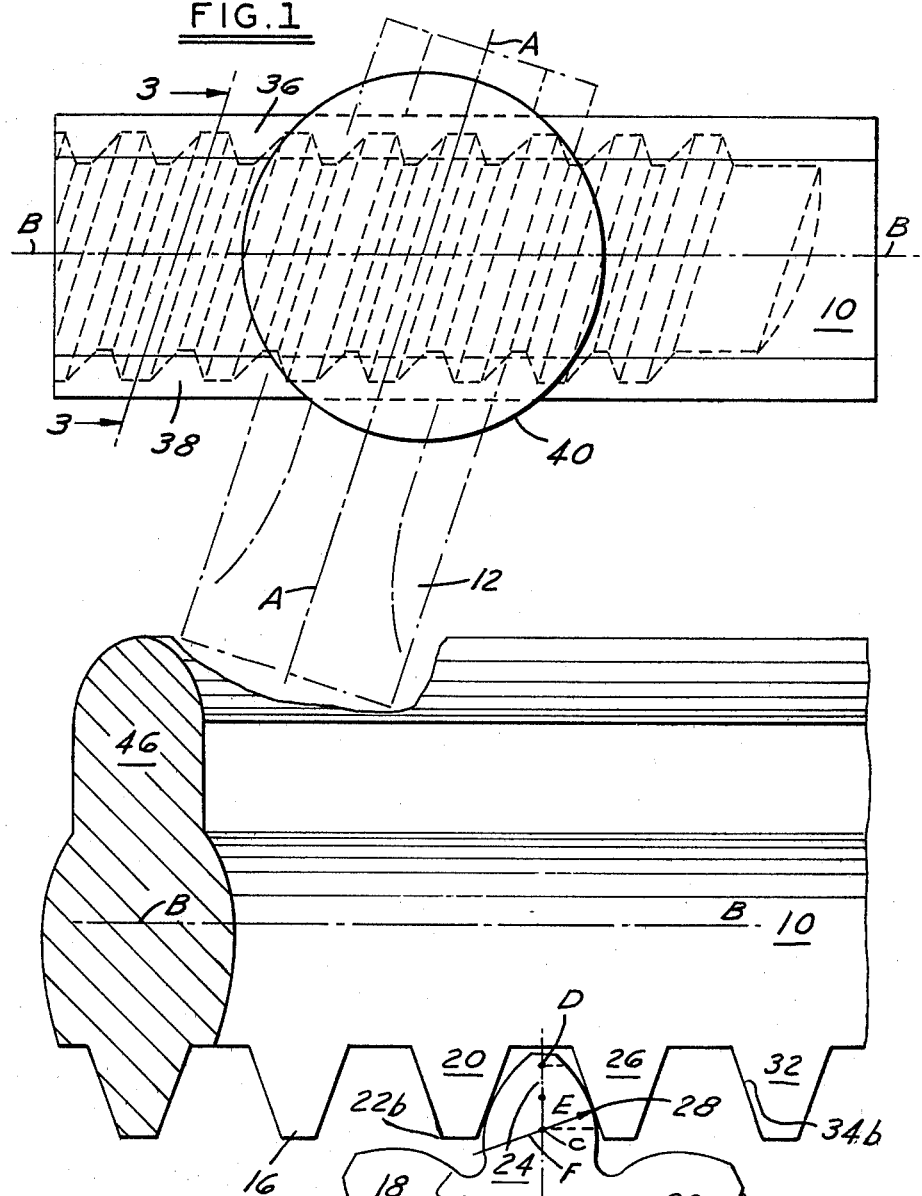
FIG. 1 is a plan view of a pinion driving an axially moveable rack shaft showing a saddle bearing supporting the rack.
Figure 2:
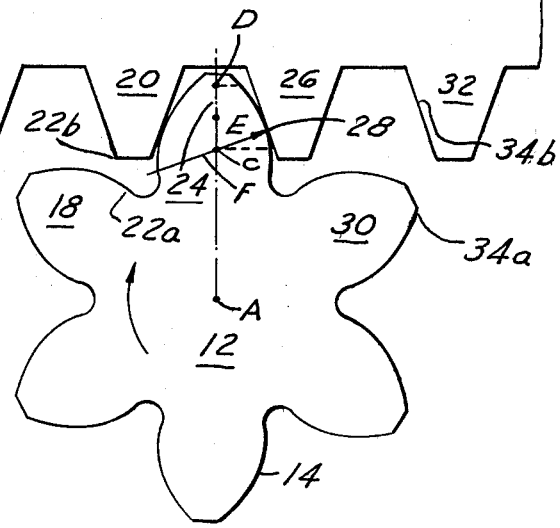
FIG. 2 is an elevational view of the rack and pinion mechanism of FIG. 1 taken along the longitudinal axis of the pinion, but with the saddle bearing removed.

Referring to FIGS. 1 and 2, an axially moveable rack 10, which may be formed from a circular cylindrical shaft, is seen in meshing engagement with a driving pinion 12. The pinion may have a spur gear teeth 14 formed thereon meshing with the trapezoidal teeth 16 formed on the lower surface of the rack. When the pinion has spur gear teeth, the longitudinal axis of the pinion A-A appears to intersect the longitudinal axis B-B of the rack when viewed from above as in FIG. 1. Alternatively, the pinion may have helical gear teeth formed thereon and the axes may be disposed perpendicularly. Rotation of the pinion about its axis A-A in a clockwise direction as viewed in FIG. 2 will allow the teeth on the pinion to engage the teeth of the rack thereby causing the rack to move parallel to its axis in the right-hand direction. The pinion teeth 14 fit snugly within the recess between rack teeth 16 so that counter-clockwise movement of the pinion causes almost immediately leftward displacement of the rack. When used as part of a steering gearing system for automotive vehicles, the axial ends of the rack shaft are connected to the steering mechanism for the front wheels of the vehicle and the rightward and leftward displacement of the rack shaft allows the front wheels of the vehicle to be steered. The steering wheel of the vehicle is connected to the pinion; therefore, clockwise and counterclockwise movement of the steering wheel causes the rightward and leftward displacement of the rack shaft.

Assuming the pinion is rotated clockwise when viewed as in FIG. 2, the pinion tooth 18 will first contact the rack tooth 20 at a point 22a thus defining a corresponding contact point 22b near the tip of the rack tooth 20. As the pinion rotates, the contact point 22a will move outwardly along the face of the tooth 18. For example, the pinion tooth 24 can be seen making contact with the rack tooth 26 at a mutual contact point 28. Point 28 is more distant from the axis A-A of the pinion 14 than is point 22a. Progressing further in clockwise rotation, pinion tooth 30 has become disengaged from rack tooth 32 but the point of mutual contact between teeth 30 and 32 at the instant immediately preceeding disengagement was at the contact points 34a, 34b. It is possible that several teeth of the pinion 12 would be engaged with the teeth of the rack concurrently.

The contact point has been described as moving along the profile of the pinion tooth from a point near the root of the tooth to a point near the tip of the tooth. The contact surface, so defined, can be projected onto a radius of the pinion and the contact surface would appear on that radius to extend between the points C and D. The pitch radius of the pinion 12 is represented by the line A-C. Therefore, the projection onto the radius of the pinion of the point on the pinion tooth face which first engages a rack tooth is seen to be located at approximately the pitch radius of the pinion. The point E represents the midpoint of the line C-D.

The point E is distant from the axis A-A in the pinion 12 by an amount that approximates 25% of the pitch radius A-C of the pinion.

Figure 3:
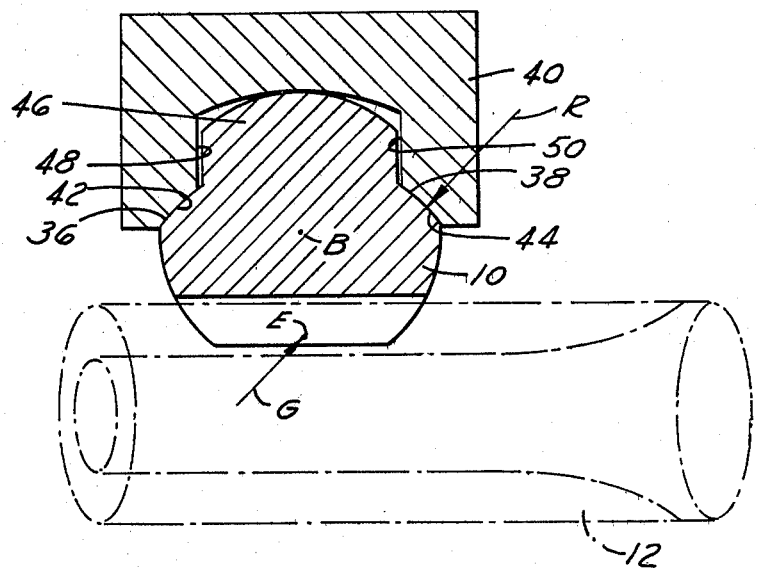
FIG. 3 is a cross-sectional view taken at a plane 3—3 through the rack shaft of FIG. 1 between adjacent rack teeth showing the surfaces of the saddle bearing supporting the rack shaft.

Referring now to FIG. 3, the rack shaft 10 has a first surface 36 and second surface 38 formed thereon whose center of curvature is located at point E. The surfaces 36 and 38 are shown extending along the entire length of the rack 10. A saddle bearing 40 is positioned above the pinion 12 and furnishes surfaces 42, 44 which are complementary to and in supporting contact with the surfaces 36, 38, respectively. The rack has a central portion 46 located between surfaces 48, 50 of the saddle bearing 40. The distance between the surfaces 48, 50 is greater than the width of the central portion 46 so that the rack shaft 10 may pivot on the surfaces 42, 44 about the axis E without contacting the saddle bearing 40.

The teeth of the pinion meshing with the teeth on the rack produce a driving load therebetween represented by vector F of FIG. 2 which is directed normal to the contour of the rack teeth. Vector F, which represents the load that is distributed on the contact surface of the rack tooth face, has a component represented by Vector G in FIG. 3 that is directed upward and transverse to axis B-B. The reaction force, Vector R, on the cylindrical bearing surface 38 of the rack shaft 10 is aligned with and oppositely directed to Vector G. Consequently, rack 10 has no tendency to rock about its axis B-B as it would with conventional support wherein the reaction force is not aligned with the applied load. If the pinion were rotated counterclockwise when viewed as in FIG. 2, Vector G would be directed toward support surface 42 and the reaction force, Vector R, would again be aligned with and oppositely directed to Vector G. Therefore, the rack 10 would not rotate about its axis B-B.

Figure 4:
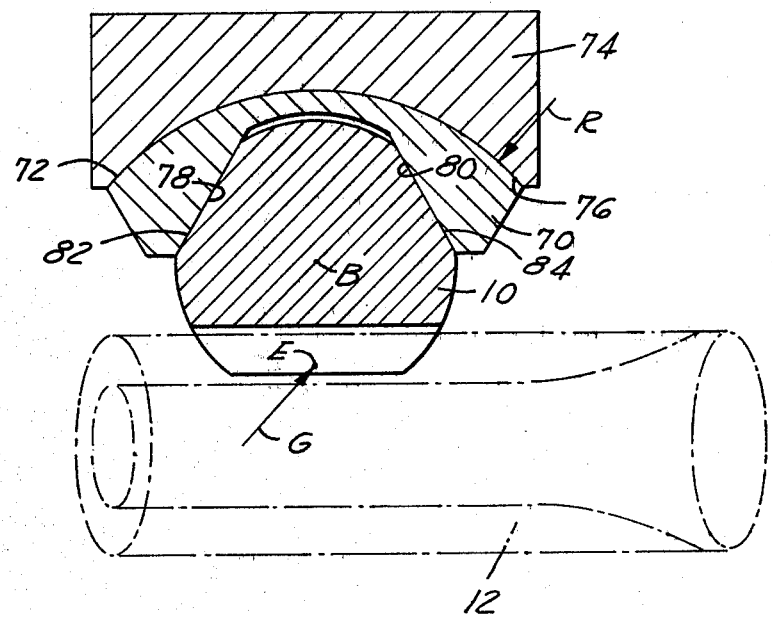
FIG. 4 is a second embodiment showing, in a cross-sectional view taken at a plane 3—3 through the rack shaft of FIG. 1 between adjacent rack teeth, another means for furnishing support for the rack shaft according to the invention.

A second embodiment of my invention is shown in FIG. 4. A cradle bearing 70 has an outer contour 72 and a saddle bearing 74 has an inner contour 76 complementary to and engaged with the contour 72 to support the rack shaft 10. The rack shaft in this instance has first and second planar surfaces 78, 80 formed on opposite sides of the longitudinal axis B-B of the rack. Inner surfaces 82, 84 of the cradle bearing 70 are held in contact with the surfaces 78, 80, respectively, of the rack shaft 10. The center of curvature of the cylindrical surfaces 72, 76 is located at the point E, the midpoint of the contact surface projected onto the radius of the pinion 12. The saddle bearing 74 is supported by the steering gear housing and applies support to the rack shaft at the contact surface 72, 76 between the saddle bearing and the rack 10. By this means, the rack is free to move axially on the surfaces 82, 84 and pivoting motion of the rack is permitted on the cylindrical surfaces 76.

I claim:
1. A rack and pinion gear mechanism comprising:
 a driving pinion;
 a rack in meshing engagement with and driven by said pinion having at least two bearing surfaces whose center of curvature is located at the midpoint of a radial plane disposed perpendicular to the rack axis and passing through the center of a pinion tooth, the plane extending radially between the projection onto the plane of the radial extremities between which the contact point between a pinion tooth and a rack tooth moves on the face of the pinion tooth; and a saddle bearing for supporting said rack having bearing surfaces disposed on opposite sides of the plane, mating with and complementary to the bearing surfaces of said rack.

2. The rack and pinion mechanism according to claim 1 wherein the midpoint of the radial plane is located in the radial plane between the pitch radius of the pinion teeth and 125 percent of the pitch radius.

3. The rack and pinion mechanism according to claim 1 wherein the rack is free to rotate about the center of curvature, whereby line contact between the teeth of the pinion and the rack is produced and the loads developed by driving contact therebetween are uniform across the tooth faces.

4. A rack and pinion gear mechanism comprising:
a driving pinion;
a rack in meshing engagement with and driven by said pinion having at least two surfaces disposed on opposite sides of a plane containing the longitudinal axis of said rack;
a cradle bearing mounted on the surfaces of said rack having a bearing surface; and
a saddle bearing having a surface complementary to and engaged with the bearing surface of said rack having a center of curvature located at the midpoint of a radial plane disposed perpendicular to the rack axis and passing through the center of a pinion tooth, the plane extending radially between the projection onto the plane of the radial extremities between which the contact point between a pinion tooth and a rack tooth moves on the face of the pinion tooth.

5. The rack and pinion mechanism according to claim 1, wherein the midpoint of the radial plane is located in the radial plane between the pitch radius of the pinion teeth and 125 percent of the pitch radius.

* * * * *